United States Patent
Li

(10) Patent No.: US 11,805,475 B2
(45) Date of Patent: Oct. 31, 2023

(54) ACCESS CONTROL BARRING METHOD AND APPARATUS

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 408 days.

(21) Appl. No.: 17/271,513

(22) PCT Filed: Aug. 29, 2018

(86) PCT No.: PCT/CN2018/102942
§ 371 (c)(1),
(2) Date: Feb. 25, 2021

(87) PCT Pub. No.: WO2020/042010
PCT Pub. Date: Mar. 5, 2020

(65) Prior Publication Data
US 2021/0176700 A1    Jun. 10, 2021

(51) Int. Cl.
*H04W 48/16*    (2009.01)
*H04W 76/27*    (2018.01)
(Continued)

(52) U.S. Cl.
CPC ........... *H04W 48/16* (2013.01); *H04W 48/08* (2013.01); *H04W 74/0833* (2013.01); *H04W 76/27* (2018.02); *H04W 80/02* (2013.01)

(58) Field of Classification Search
CPC . H04W 48/16; H04W 48/08; H04W 74/0833; H04W 76/27; H04W 80/02
See application file for complete search history.

(56) References Cited

U.S. PATENT DOCUMENTS

| 2013/0170343 | A1  | 7/2013 | Ye et al. |
| 2014/0098761 | A1* | 4/2014 | Lee ............ H04W 24/02 370/329 |

(Continued)

FOREIGN PATENT DOCUMENTS

| CN | 101674613 A | 3/2010 |
| CN | 102196496 A | 9/2011 |

(Continued)

OTHER PUBLICATIONS

State Intellectual Property Office of the People's Republic of China, Office Action and Search Report Issued in Application No. 201880001854.8, dated Jul. 23, 2021, 27 pages.
ISA State Intellectual Property Office of the People's Republic of China, Written Opinion of the International Searching Authority Issued in Application No. PCT/CN2018/102942, dated May 30, 2019, WIPO, 9 pages.

(Continued)

*Primary Examiner* — Diane D Mizrahi
(74) *Attorney, Agent, or Firm* — Finnegan, Henderson, Farabow, Garrett & Dunner, L.L.P.

(57) ABSTRACT

The present disclosure relates to a method and an apparatus for access control barring. The method includes: performing an access attempt at a designated coverage enhancement level; when the access attempt fails, determining a corresponding access attempt barring scheme based on a preset rule; and performing corresponding access attempt barring based on the corresponding access attempt barring scheme. Therefore, the present disclosure can avoid unlimited access attempts at the designated coverage enhancement level, thereby reducing resource consumption and improving the reliability of access control barring.

14 Claims, 5 Drawing Sheets

(51) Int. Cl.
  *H04W 48/08* (2009.01)
  *H04W 74/08* (2009.01)
  *H04W 80/02* (2009.01)

(56) References Cited

U.S. PATENT DOCUMENTS

| | | |
|---|---|---|
| 2016/0295609 A1 | 10/2016 | Vajapeyam et al. |
| 2018/0020382 A1* | 1/2018 | Kim .................. H04W 48/10 |

FOREIGN PATENT DOCUMENTS

| | | |
|---|---|---|
| CN | 103052141 A | 4/2013 |
| CN | 104137615 A | 11/2014 |
| CN | 105309010 A | 2/2016 |
| CN | 107431986 A | 12/2017 |
| CN | 107432042 A | 12/2017 |
| CN | 108093451 A | 5/2018 |
| CN | 108462978 A | 8/2018 |
| WO | WO 2017/077175 A1 | 5/2017 |
| WO | WO 2017/193813 A1 | 11/2017 |
| WO | WO 2017/196056 A3 | 11/2017 |
| WO | WO 2018/146150 A1 | 8/2018 |

OTHER PUBLICATIONS

ISA State Intellectual Property Office of the People's Republic of China, International Search Report Issued in Application No. PCT/CN2018/102942, dated May 30, 2019, WIPO, 4 pages.
ZTE, Sanechips, "Further consideration on supporting CEL-based access barring for eFeMTC",3GPP TSG-RAN WG2 Meeting#101, Athens, Greece, R2-1802159, Feb. 26-Mar. 2, 2018, 4 pages.
Sierra Wireless, "Report of email discussion [101bis#78][NB-IoT/eMTC] access/load control of idle mode Ues", 3GPP TSG-RAN WG2 Meeting#102, Busan, South Korea, R2-1808188, May 21-25, 2018, 19 pages.
3GPP TS 36.331 V16.3.0, 3rd Generation Partnership Project; Technical Specification Group Radio Access Network; Evolved Universal Terrestrial Radio Access (E-UTRA); Radio Resource Control (RRC); Protocol specification (Release 16), dated Dec. 2020, 1083 pages.
3GPP TS 24.301 V17.1.0 (Dec. 2020), 3rd Generation Partnership Project; Technical Specification Group Core Network and Terminals; Non-Access-Stratum (NAS) protocol for Evolved Packet System (EPS); Stage 3 (Release 17); dated Dec. 2020, 586 pages.

\* cited by examiner

ACCESS CONTROL BARRING METHOD AND APPARATUS

CROSS REFERENCE TO RELATED APPLICATIONS

This application is a national phase application based on International Application No. PCT/CN2018/102942, filed Aug. 29, 2018, the content of which is incorporated herein by reference.

TECHNICAL FIELD

The present disclosure relates to the technical field of telecommunication, and in particular, to a method and an apparatus for access control barring.

BACKGROUND

In an LTE (Long Term Evolution) telecommunication system, the working mechanism of AC (Access Control) barring is: obtaining a corresponding access control barring parameter based on an access class of a terminal and a call type of a call initiated by the terminal, and performing AC barring check.

In a new generation of telecommunication system, for an enhanced coverage scenario of an NB-IOT (Narrow Band Internet of Things) and eMTC (enhanced machine type of communication), an AC barring mechanism is also introduced, serving a purpose of barring a user under enhanced coverage at an edge of a cell. In addition, the AC barring mechanism in the enhanced coverage scenario is to bar based on a coverage enhancement level (CE level).

Therefore, in a random access process, if a terminal fails an access attempt at a CE level and fails at a next CE level, the terminal will continue to try at the current CE level, resulting in considerable resource consumption.

SUMMARY

In order to alleviate the problem existing in the related art, examples of the present disclosure provide a method and an apparatus for access control barring.

According to a first aspect of the examples of the present disclosure, there is provided a method for access control barring applied to a terminal, the method including:

performing an access attempt at a designated coverage enhancement level;

when the access attempt fails, determining a corresponding access attempt barring scheme based on a preset rule; and performing corresponding access attempt barring based on the corresponding access attempt barring scheme.

In an example, the preset rule includes first indication information configured to indicate terminating an access attempt ahead of schedule;

determining a corresponding access attempt barring scheme based on a preset rule includes:

determining a first barring scheme based on the first indication information, wherein the first barring scheme indicates terminating an access attempt at the designated coverage enhancement level ahead of schedule.

In an example, performing corresponding access attempt barring based on the corresponding access attempt barring scheme includes:

generating, through a MAC layer of the terminal, error notification information configured to indicate that a random access process error has occurred, and sending the error notification information to a radio resource control (RRC) layer of the terminal.

In an example, the preset rule includes a designated number of attempts or second indication information configured to indicate the designated number of attempts;

determining a corresponding access attempt barring scheme based on a preset rule includes:

determining a second barring scheme based on the designated number of attempts, wherein the second barring scheme indicates performing an access attempt at the designated coverage enhancement level based on the designated number of attempts.

In an example, performing corresponding access attempt barring based on the corresponding access attempt barring scheme includes:

continuing an access attempt at the designated coverage enhancement level until a number of failed attempts reaches the designated number of attempts, and generating, through a MAC layer of the terminal, error notification information configured to indicate that a random access process error has occurred, and sending the error notification information to an RRC layer of the terminal.

In an example, the error notification information includes an indication of cause of the random access process error.

In an example, the method further includes:

terminating, through the RRC layer of the terminal, an RRC timer ahead of schedule based on the error notification information in response to receiving the error notification information, and notifying the MAC layer of the terminal to terminate further attempt.

In an example, the method further includes:

withholding terminating, through the RRC layer of the terminal, the RRC timer ahead of schedule based on the error notification information in response to receiving the error notification information, and providing an additional condition for the MAC layer of the terminal to continue an access attempt at the designated coverage enhancement level.

In an example, the preset rule is stipulated by a communication protocol or written into the terminal in a form of firmware.

In an example, the preset rule is notified to the terminal by a base station through a system message or designated signaling;

determining a corresponding access attempt barring scheme based on a preset rule includes:

when the designated signaling includes the preset rule, determining, through the terminal, an access attempt barring scheme corresponding to the designated coverage enhancement level based on the preset rule included in the designated signaling; and when the designated signaling does not include the preset rule, determining, through the terminal, an access attempt barring scheme corresponding to the designated coverage enhancement level based on the preset rule included in the system message.

In an example, the system message or the designated signaling also includes an effective time and/or an effective area for using the preset rule; and determining a corresponding access attempt barring scheme based on a preset rule includes:

within the effective time and/or the effective area of the preset rule, determining an access attempt barring scheme corresponding to the designated coverage enhancement level based on the preset rule.

According to a second aspect of the examples of the present disclosure, there is provided an apparatus for access control barring applied to a terminal, the apparatus including:

an access attempt module configured to perform an access attempt at a designated coverage enhancement level;

a determining module configured to, when the access attempt fails, determine a corresponding access attempt barring scheme based on a preset rule; and a barring module configured to perform corresponding access attempt barring based on the corresponding access attempt barring scheme.

In an example, the preset rule includes first indication information configured to indicate terminating an access attempt ahead of schedule; and the determining module includes:

a first determining submodule configured to determine a first barring scheme based on the first indication information, wherein the first barring scheme indicates terminating an access attempt at the designated coverage enhancement level ahead of schedule.

In an example, the barring module includes:

a first processing submodule configured to generate error notification information through a MAC layer of the terminal, wherein the error notification information is configured to indicate that a random access process error has occurred, and send the error notification information to a radio resource control (RRC) layer of the terminal.

In an example, the preset rule includes a designated number of attempts or second indication information configured to indicate the designated number of attempts; and the determining module includes:

a second determining submodule configured to determine a second barring scheme based on the designated number of attempts, wherein the second barring scheme indicates performing an access attempt at the designated coverage enhancement level based on the designated number of attempts.

In an example, the barring module includes:

a second processing submodule configured to continue an access attempt at the designated coverage enhancement level until a number of failed attempts reaches the designated number of attempts, and generate, through a MAC layer of the terminal, error notification information configured to indicate that a random access process error has occurred, and sends the error notification information to an RRC layer of the terminal.

In an example, the error notification information includes an indication of cause of the random access process error.

In an example, the apparatus further includes:

an attempt terminating module configured to, terminate an RRC timer ahead of schedule based on the error notification information the RRC layer of the terminal receiving the error notification information, and notify the MAC layer of the terminal to terminate further attempt.

In an example, the apparatus further includes:

an attempt continuation module configured to, withhold terminate the RRC timer ahead of schedule based on the error notification information in response to the RRC layer of the terminal receiving the error notification information, and provide an additional condition for the MAC layer of the terminal to continue an access attempt at the designated coverage enhancement level.

In an example, the preset rule is stipulated by a communication protocol or written into the terminal in a form of firmware.

In an example, the preset rule is notified to the terminal by a base station through a system message or designated signaling; and the determining module includes:

a third determining submodule configured to, when the designated signaling includes the preset rule, determine an access attempt barring scheme corresponding to the designated coverage enhancement level based on the preset rule included in the designated signaling; and a fourth determining submodule configured to, when the designated signaling does not include the preset rule, determine an access attempt barring scheme corresponding to the designated coverage enhancement level based on the preset rule included in the system message.

In an example, the system message or the designated signaling also includes an effective time and/or an effective area for using the preset rule; and the determining module includes:

a fifth determining submodule configured to, within the effective time and/or the effective area of the preset rule, determine an access attempt barring scheme corresponding to the designated coverage enhancement level based on the preset rule.

According to a third aspect of the examples of the present disclosure, there is provided a non-transitory computer-readable storage medium storing a computer program, wherein the computer program is configured to perform the method for access control barring of the first aspect.

According to a fourth aspect of the examples of the present disclosure, there is provided an apparatus for access control barring applied to a terminal, the apparatus including:

a processor; and a memory for storing instructions executable by the processor;

wherein the processor is configured to perform an access attempt at a designated coverage enhancement level;

when the access attempt fails, determine a corresponding access attempt barring scheme based on a preset rule; and perform corresponding access attempt barring based on the corresponding access attempt barring scheme.

The technical solution provided by the examples of the present disclosure can bring about the following beneficial effects.

In the present disclosure, when a terminal performs an access attempt at a designated coverage enhancement level, when the access attempt fails, a corresponding access attempt barring scheme can be determined based on a preset rule, and corresponding access attempt barring is performed according to the access attempt barring scheme, which can avoid unlimited access attempts at the designated coverage enhancement level, thereby reducing resource consumption and improving the reliability of access control barring.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
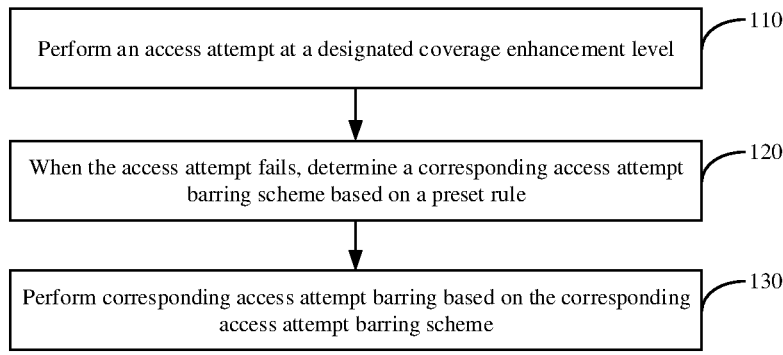
FIG. 1 is a flowchart illustrating a method for access control barring according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms using "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

Figure 2:
FIG. 2 is an application scenario diagram illustrating a method for access control barring according to an example.

FIG. 1 is a flowchart illustrating a method for access control barring according to an example, and FIG. 2 is an application scenario diagram illustrating a method for access control barring according to an example. The method for access control barring can be used for a terminal, and the terminal can be UE (User Equipment). As shown in FIG. 1, the method for access control barring can include the following steps 110-130.

At step 110, an access attempt is performed at a designated coverage enhancement level.

In the examples of the present disclosure, the designated coverage enhancement level can be a next coverage enhancement level that the terminal migrates to after the terminal fails to access at a coverage enhancement level.

For example, there are three coverage enhancement levels, namely CE Level0, CE Level1 and CE Level2. If the terminal can normally access at CE Level0 at first, but later due to poor channel conditions, the terminal fails to access at CE Level0, the terminal can migrate to CE level1 for an access attempt. If the attempt succeeds, the terminal can access at CE level1, and initiate a random access process.

At step 120, when the access attempt fails, a corresponding access attempt barring scheme is determined based on a preset rule.

In the examples of the present disclosure, when an access attempt is made at a designated coverage enhancement level, in order to avoid a large amount of resource consumption, the terminal can determine a corresponding access attempt barring scheme based on a preset rule, and implement corresponding access attempt barring based on the access attempt barring scheme.

Figure 3:
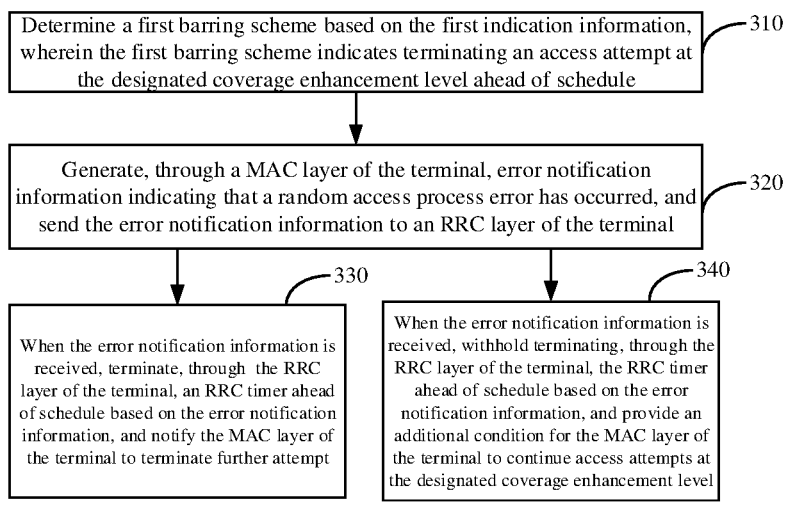
FIG. 3 is a flowchart illustrating another method for access control barring according to an example.

For example, the access attempt barring scheme is a first barring scheme, and the first barring scheme is used to indicate terminating an access attempt at the designated coverage enhancement level ahead of schedule, the specific implementation process of which can refer to the example shown in FIG. 3.

Figure 4:
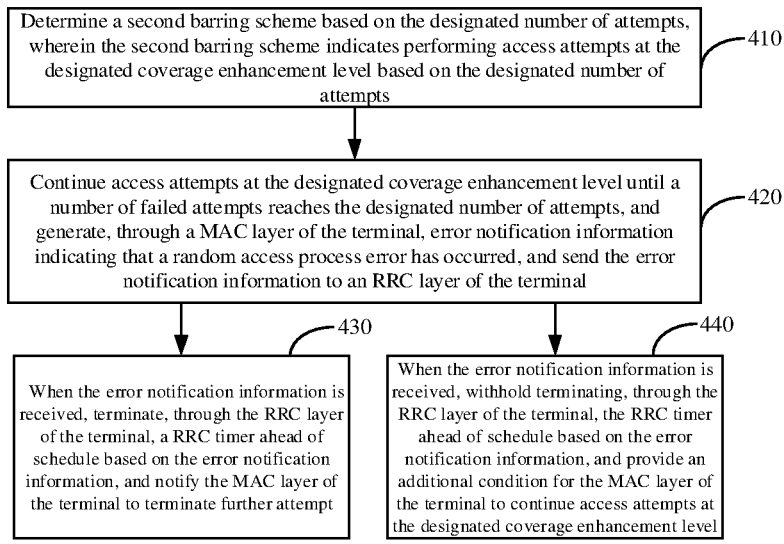
FIG. 4 is a flowchart illustrating another method for access control barring according to an example.

For another example, the access attempt barring scheme is a second barring scheme, and the second barring scheme is used to indicate performing a designated number of access attempts at the designated coverage enhancement level, the specific implementation process of which can refer to the example shown in FIG. 4.

In addition, there are many approaches to obtain the preset rule, including but not limited to the following three approaches.

Approach 1: the preset rule is stipulated by a communication protocol or written into the terminal in a form of firmware.

Approach 2: the preset rule is notified to the terminal by a base station through a system message or designated signaling. For example, the designated signaling is dedicated signaling used by the base station to notify the terminal to enter an idle state or a suspended state.

With Approach 2, step 120 can include the following steps.

(1-1) When the designated signaling includes the preset rule, the terminal determines the access attempt barring scheme corresponding to the designated coverage enhancement level based on the preset rule included in the designated signaling.

(1-2) When the designated signaling does not include the preset rule, the terminal determines the access attempt barring scheme corresponding to the designated coverage enhancement level based on the preset rule included in the system message.

Approach 3: in addition to the content of Approach 2, the system message or the designated signaling also includes the effective time and/or effective area for using the preset rule.

With Approach 3, step 120 can include the following steps.

(2-1) Within the effective time and/or effective area of the preset rule, an access attempt barring scheme corresponding to the designated coverage enhancement level is determined based on the preset rule.

In the examples of the present disclosure, the effective time can be agreed on by the system or configured by the network, for example: within 300 seconds. The effective area can also be agreed on by the system or configured by the network. If the effective area is agreed on by the system, the effective area can only be limited to a cell when a connection is released and/or RAN-based Notification Area (RNA) and/or Tracking Area (TA). If the effective area is configured by the network, a cell list and/or RAN-based notification area list and/or tracking area list can be configured. Here, RAN is the abbreviation for Radio Access Network.

At step 130, corresponding access attempt barring is performed based on the corresponding access attempt barring scheme.

In an example scenario, as shown in FIG. 2, a base station and a terminal are involved. In an enhanced coverage scenario, such as NB-IOT or eMTC, during a random access process initiated by the terminal for accessing the base station, if the terminal fails to access at a coverage enhancement level, the terminal can migrate to a next coverage enhancement level to perform access attempt. If the attempt fails at the next coverage enhancement level, the access attempt barring scheme corresponding to the coverage enhancement level can be determined based on a preset rule at this time, and the access attempt barring is performed according to the access attempt barring scheme.

It can be seen from the above example that when an access attempt is made at a designated coverage enhancement level, if the access attempt fails, a corresponding access attempt barring scheme can be determined based on a preset rule, and corresponding access attempt barring is performed according to the access attempt barring scheme, which can avoid unlimited access attempts at the designated coverage enhancement level, thereby reducing resource consumption and improving the reliability of access control barring.

FIG. 3 is a flowchart illustrating another method for access control barring according to an example. The method for access control barring can be used in a terminal, and based on the method shown in FIG. 1, the preset rule includes first indication information, and the first indication information is used to indicate terminating an access attempt ahead of schedule. In one example, the preset rule is designated by a communication protocol or written into the terminal in the form of firmware. In an example, the preset rule is notified by the base station to the terminal through a system message or designated signaling. When step 120 is performed, as shown in FIG. 3, the following step 310 can be included.

At step 310, a first barring scheme is determined based on the first indication information, and the first barring scheme indicates terminating an access attempt at the designated coverage enhancement level ahead of schedule.

In an example, when step 130 is performed, as shown in FIG. 3, the following step 320 can be included.

At step 320, error notification information indicating that a random access process error has occurred is generated through a MAC (Media Access Control) layer of the terminal, and sent to an RRC (Radio Resource Control) layer of the terminal. The error notification information can include an indication of the cause of the random access process error.

In an example, as shown in FIG. 3, the method for access control barring can further include step 330.

At step 330, when the error notification information is received, the RRC layer of the terminal terminates an RRC timer ahead of schedule based on the error notification information, and notifies the MAC layer of the terminal to terminate further attempt. Here, the RRC timer can be T300.

In an example, as shown in FIG. 3, the method for access control barring can further include step 340.

At step 340, when the error notification information is received, the RRC layer of the terminal does not terminate the RRC timer ahead of schedule based on the first indication information, and provides an additional condition for the MAC layer of the terminal to continue access attempts at the designated coverage enhancement level.

The additional condition can include a designated number of continued attempts; after the number of the attempts has reached the designated number, the RRC layer of the terminal is notified for another time that a random access process error has occurred. The additional condition can also include an indication indicating the terminal to continue a corresponding number of access attempts at the designated coverage enhancement level, where the corresponding number of the continued attempts matches the designated coverage enhancement level; after the number of the attempts has reached the indicated number of continued attempts, the RRC layer of the terminal is notified for another time that a random access process error has occurred.

In other words, the MAC layer of the terminal can continue to perform access attempts at the designated coverage enhancement level based on the number of continued attempts provided by the RRC layer of the terminal. When the number of failed attempts reaches the number of continued attempts provided by the RRC layer of the terminal, the MAC layer of the terminal can generate error notification information again, and send the generated error notification information to the RRC layer of the terminal, and the RRC layer of the terminal decides whether to terminate further attempt or provides for another time an addition condition for continued access attempts at the designated coverage enhancement level, and so on.

It can be seen from the above example that after an access attempt at the designated coverage enhancement level is determined to be terminated ahead of schedule based on a preset rule, the MAC layer of the terminal can also notify the RRC layer of the terminal that a random access process error has occurred, and the RRC layer of the terminal finally decides whether to terminate the access attempt or perform the access attempt under an additional condition, thereby improving the accuracy of the access control barring.

FIG. 4 is a flowchart illustrating another method for access control barring according to an example. The method for access control barring can be used in a terminal, and based on the method shown in FIG. 1, the preset rule includes a designated number of attempts or second indication information used to indicate the designated number of attempts. In one example, the preset rule is stipulated by a communication protocol or written into the terminal in the form of firmware. In one example, the preset rule is notified to the terminal by the base station through a system message or designated signaling. When step 120 is performed, as shown in FIG. 4, the following step 410 can be included.

At step 410, a second barring scheme is determined based on the designated number of attempts, where the second barring scheme indicates performing access attempts at the designated coverage enhancement level based on the designated number of attempts.

In an example, when step 130 is performed, as shown in FIG. 4, the following step 420 can be included.

At step 420, access attempts are continued at the designated coverage enhancement level until a number of failed attempts reaches the designated number of attempts, and error notification information indicating that a random access process error has occurred is generated through the MAC layer of the terminal and sent to the RRC layer of the terminal. The error notification information can include an indication of the cause of the random access process error.

In an example, as shown in FIG. 4, the method for access control barring can further include step 430.

At step 430, when the error notification information is received, the RRC layer of the terminal terminates an RRC timer ahead of schedule based on the error notification information, and notifies the MAC layer of the terminal to terminate further attempt. The RRC timer can be T300.

In an example, as shown in FIG. 4, the method for access control barring can further include step 440.

At step 440, when the error notification information is received, the RRC layer of the terminal does not terminate the RRC timer ahead of schedule based on the error notification information, and provides an additional condition for a MAC layer of the terminal to continue access attempts at the designated coverage enhancement level.

The additional condition can include a designated number of continued attempts; after the number of the attempts has reached the designated number, the RRC layer of the terminal is notified for another time that a random access process error has occurred. The additional condition can also include an indication indicating the terminal to continue a corresponding number of access attempts at the designated coverage enhancement level, where the corresponding number of the continued attempts matches the designated coverage enhancement level; after the number of the attempts has reached the indicated number of continued attempts, the RRC layer of the terminal is notified for another time that a random access process error has occurred.

In other words, the MAC layer of the terminal can continue to perform access attempts at the designated coverage enhancement level based on the number of continued attempts provided by the RRC layer of the terminal. When the number of failed attempts reaches the number of continued attempts provided by the RRC layer of the terminal, the MAC layer of the terminal can generate error notification information again, and send the generated error notification information to the RRC layer of the terminal, and the RRC layer of the terminal decides whether to terminate further attempt or provides for another time an addition condition for continued access attempts at the designated coverage enhancement level, and so on.

It can be seen from the above example that after it is determined based on a preset rule that access attempts are made at the designated coverage enhancement level based on the designated number of attempts, and the number of failed attempts reaches the designated number of attempts, the MAC layer of the terminal can also notify the RRC layer of the terminal that a random access process error has occurred, and the RRC layer of the terminal finally decides whether to terminate the access attempt or continue the access attempt under an additional condition, thereby improving the reliability of the access control barring.

Corresponding to the above examples of the method for access control barring, the present disclosure also provides examples of an apparatus for access control barring.

Figure 5:
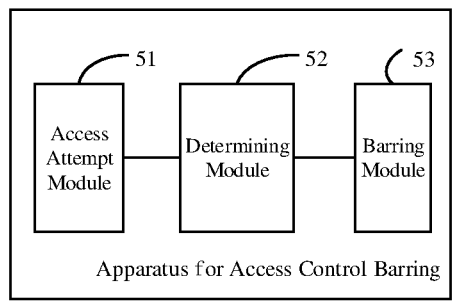
FIG. 5 is a block diagram illustrating an apparatus for access control barring according to an example.

FIG. 5 is a block diagram illustrating an apparatus for access control barring according to an example. The apparatus is used in a terminal and configured to perform the method for access control barring shown in FIG. 1. As shown in FIG. 5, the apparatus for access control barring can include the following components.

An access attempt module 51 is configured to perform an access attempt at a designated coverage enhancement level.

A determining module 52 is configured to, when the access attempt fails, determine a corresponding access attempt barring scheme based on a preset rule.

A barring module 53 is configured to perform corresponding access attempt barring based on the corresponding access attempt barring scheme.

It can be seen from the above example that when an access attempt is made at a designated coverage enhancement level, if the access attempt fails, a corresponding access attempt barring scheme can be determined based on a preset rule, and corresponding access attempt barring is performed according to the access attempt barring scheme, which can avoid unlimited access attempts at the designated coverage enhancement level, thereby reducing resource consumption and improving the reliability of access control barring.

Figure 6:
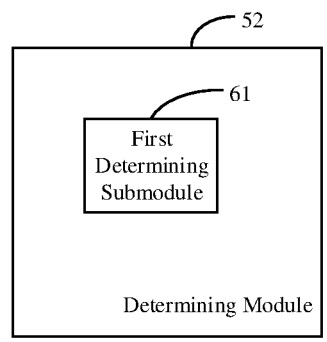
FIG. 6 is a block diagram illustrating an apparatus for access control barring according to an example.

In an example, based on the apparatus shown in FIG. 5, the preset rule includes first indication information, and the first indication information is used to indicate terminating an access attempt ahead of schedule. As shown in FIG. 6, the determining module 52 can include the following component.

A first determining submodule 61 is configured to determine a first barring scheme based on the first indication information, where the first barring scheme indicates terminating an access attempt at the designated coverage enhancement level ahead of schedule.

Figure 7:
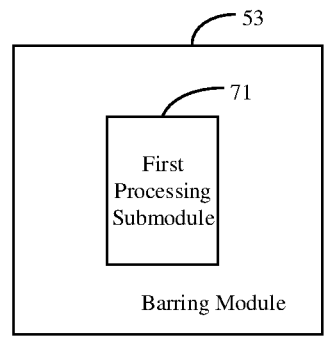
FIG. 7 is a block diagram illustrating another apparatus for access control barring according to an example.

In an example, based on the apparatus shown in FIG. 6, as shown in FIG. 7, the barring module 53 can include the following component.

A first processing submodule 71 is configured to generate error notification information through an MAC layer of the terminal, where the error notification information is used to indicate that a random access process error has occurred, and send the error notification information to an RRC layer of the terminal.

It can be seen from the above example that after an access attempt at the designated coverage enhancement level is determined to be terminated ahead of schedule based on a preset rule, the MAC layer of the terminal can also notify the RRC layer of the terminal that a random access process error has occurred, and the RRC layer of the terminal finally decides whether to terminate the access attempt or perform the access attempt under an additional condition, thereby improving the accuracy of the access control barring.

Figure 8:
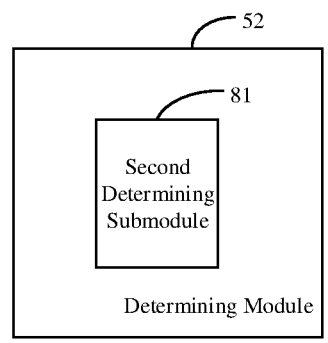
FIG. 8 is a block diagram illustrating another apparatus for access control barring according to an example.

In one example, based on the apparatus shown in FIG. 5, the preset rule includes a designated number of attempts or second indication information used to indicate the designated number of attempts. As shown in FIG. 8, the determining module 52 can include the following component.

A second determining submodule 81 is configured to determine a second barring scheme based on the designated number of attempts, where the second barring scheme indicates performing an access attempt at the designated coverage enhancement level based on the designated number of attempts.

Figure 9:
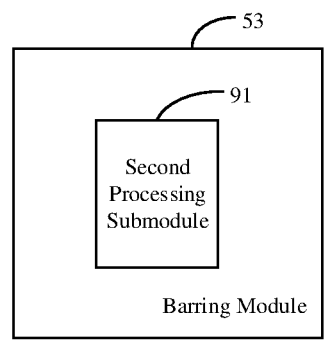
FIG. 9 is a block diagram illustrating another apparatus for access control barring according to an example.

In an example, based on the apparatus shown in FIG. 8, as shown in FIG. 9, the barring module 53 can include the following component.

A second processing submodule 91 is configured to continue an access attempt at the designated coverage enhancement level until a number of failed attempts reaches the designated number of attempts, and generate, through the MAC layer of the terminal, error notification information indicating that a random access process error has occurred, and send the error notification information to the RRC layer of the terminal.

It can be seen from the above example that after it is determined based on a preset rule that access attempts are made at the designated coverage enhancement level based on the designated number of attempts, and the number of failed attempts reaches the designated number of attempts, the MAC layer of the terminal can also notify the RRC layer of the terminal that a random access process error has occurred, and the RRC layer of the terminal finally decides whether to terminate the access attempt or continue the access attempt under an additional condition, thereby improving the reliability of the access control barring.

In an example, based on the apparatus shown in FIG. 7 or FIG. 9, the error notification information includes an indication of cause of the random access process error.

Figure 10:
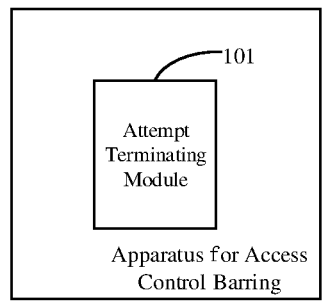
FIG. 10 is a block diagram illustrating another apparatus for access control barring according to an example.

In an example, based on the apparatus shown in FIG. 7 or FIG. 9, as shown in FIG. 10, the apparatus can further include the following component.

An attempt terminating module 101 is configured to, terminate an RRC timer ahead of schedule based on the error notification information in response to the RRC layer of the terminal receiving the error notification information, and notify the MAC layer of the terminal to terminate further attempt.

Figure 11:
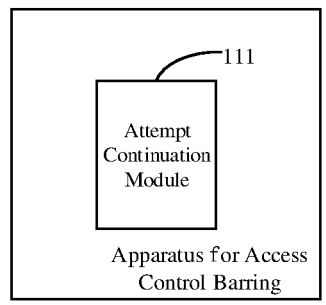
FIG. 11 is a block diagram illustrating another apparatus for access control barring according to an example.

In an example, based on the apparatus shown in FIG. 7 or FIG. 9, as shown in FIG. 11, the apparatus can further include the following component.

An attempt continuation module 111 is configured to, withhold terminating the RRC timer ahead of schedule based on the error notification information in response to the RRC layer of the terminal receiving the error notification information, and provide an additional condition for the MAC layer of the terminal to continue an access attempt at the designated coverage enhancement level.

In an example, based on the apparatus shown in FIG. 5, the preset rule is stipulated by a communication protocol or written into the terminal in a form of firmware.

Figure 12:
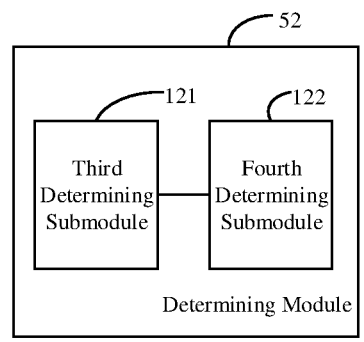
FIG. 12 is a block diagram illustrating another apparatus for access control barring according to an example.

In an example, based on the apparatus shown in FIG. 5, the preset rule is notified to the terminal by a base station through a system message or designated signaling. As shown in FIG. 12, the determining module 52 can include the following components.

A third determining submodule 121 is configured to, when the designated signaling includes the preset rule, determine an access attempt barring scheme corresponding to the designated coverage enhancement level based on the preset rule included in the designated signaling.

A fourth determining submodule 122 is configured to, when the designated signaling does not include the preset rule, determine an access attempt barring scheme corresponding to the designated coverage enhancement level based on the preset rule included in the system message.

Figure 13:
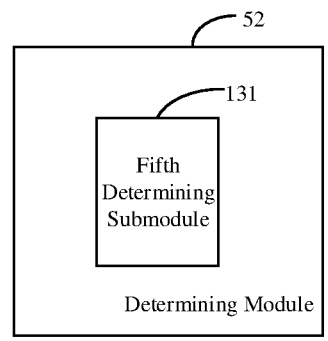
FIG. 13 is a block diagram illustrating another apparatus for access control barring according to an example.

In an example, based on the apparatus shown in FIG. 5, the system message or the designated signaling also includes an effective time and/or an effective area for using the preset rule. As shown in FIG. 13, the determining module 53 can include the following component.

A fifth determining submodule 131 is configured to, within the effective time and/or the effective area of the preset rule, determine an access attempt barring scheme corresponding to the designated coverage enhancement level based on the preset rule.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

The present disclosure also provides a non-transitory computer-readable storage medium on which a computer program is stored, and the computer program is configured to perform the method for access control barring described in any one of FIGS. 1 to 4.

The present disclosure also provides an apparatus for access control barring, the apparatus is used in a terminal, and the apparatus includes:

a processor;

a memory for storing processor executable instructions;

wherein the processor is configured to:

perform an access attempt at a designated coverage enhancement level;

when the access attempt fails, determine a corresponding access attempt barring scheme based on a preset rule; and perform corresponding access attempt barring based on the corresponding access attempt barring scheme.

Figure 14:
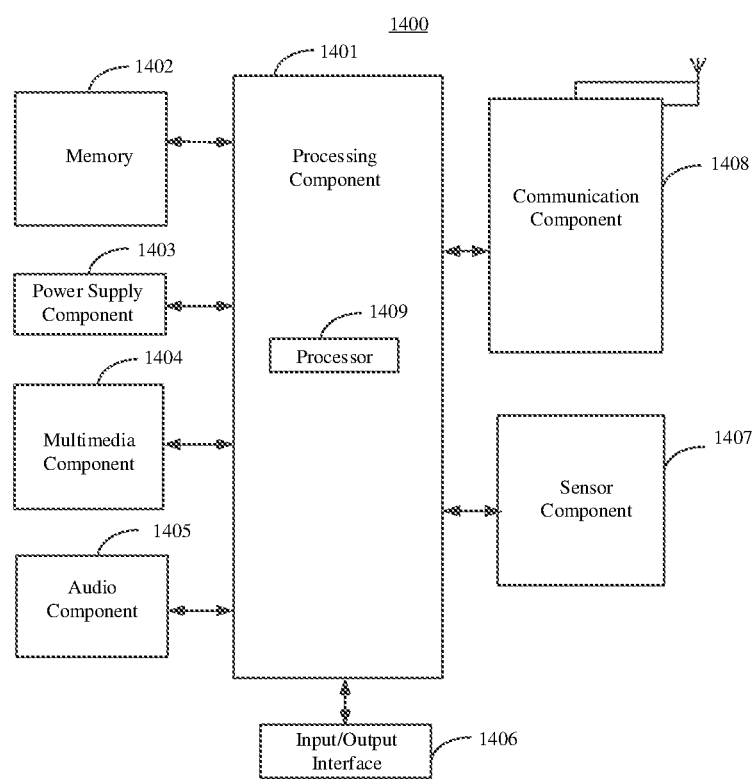
FIG. 14 is a block diagram illustrating an apparatus for access control barring according to an example.

FIG. 14 is a block diagram illustrating an apparatus for access control barring according to an example. As shown in FIG. 14, the apparatus 1400 for access control barring can be a terminal such as a computer, a mobile phone, a digital broadcasting terminal, a messaging device, a game console, a tablet device, a medical device, fitness equipment, a personal digital assistant, or the like.

As shown in FIG. 14, the apparatus 1400 can include one or more of the following components: a processing component 1401, a memory 1402, a power supply component 1403, a multimedia component 1404, an audio component 1405, an input/output (I/O) interface 1406, a sensor component 1407, and a communication component 1408.

The processing component 1401 generally controls overall operations of the apparatus 1400, such as operations associated with display, phone calls, data communications, camera operations, and recording operations. The processing component 1401 can include one or more processors 1409 to execute instructions, to complete all or part of the steps of the method. In addition, the processing component 1401 can include one or more modules which facilitate the interaction between the processing component 1401 and other components. For example, the processing component 1401 can include a multimedia module to facilitate the interaction between the multimedia component 1404 and the processing component 1401.

The memory 1402 is configured to store various types of data to support the operation of the apparatus 1400. Examples of such data include instructions for any application or method operated on the apparatus 1400, contact data, phonebook data, messages, pictures, videos, and so on. The memory 1402 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1403 supplies power for different components of the apparatus 1400. The power supply component 1403 can include a power supply management system, one or more power supplies, and other components associated with generating, managing and distributing power for the apparatus 1400.

The multimedia component 1404 includes a screen providing an output interface between the apparatus 1400 and a user. In some examples, the screen can include a Liquid Crystal Display (LCD) screen and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense duration and a pressure associated with the touch or swipe. In some examples, the multimedia component 1404 includes a front camera and/or a rear camera. When the apparatus 1400 is in an operation mode, such as a capture mode or a video mode, the front camera and/or the rear camera can receive external multimedia data. Each front camera and rear camera can be a fixed optical lens system or have focal length and optical zoom capabilities.

The audio component 1405 is configured to output and/or input an audio signal. For example, the audio component 1405 includes a microphone (MIC). When the apparatus 1400 is in an operating mode, such as a call mode, a record mode and a voice recognition mode, the microphone is to receive an external audio signal. The received audio signal can be further stored in the memory 1402 or sent via the communication component 1408. In some examples, the audio component 1405 further includes a speaker for outputting an audio signal.

The I/O interface 1406 provides an interface between the processing component 1401 and a peripheral interface module. The above peripheral interface module can be a keyboard, a click wheel, buttons, or the like. These buttons can include but are not limited to: a home button, a volume button, a start button, and a lock button.

The sensor component 1407 includes one or more sensors to provide status assessments of various aspects for the apparatus 1400. For example, the sensor component 1407 can detect the on/off status of the apparatus 1400, and relative positioning of component, for example, the component is a display screen and a keypad of the apparatus 1400. The sensor component 1407 can also detect a change in position of the apparatus 1400 or a component of the apparatus 1400, a presence or absence of the contact between a user and the apparatus 1400, an orientation or an acceleration/deceleration of the apparatus 1400, and a change in temperature of the apparatus 1400. For example, the sensor component 1407 can further include a proximity sensor configured to detect the presence of nearby objects when there is no physical contact. The sensor component 1407 can also include an optical sensor, such as a CMOS or CCD image sensor, for use in imaging applications. In some examples, the sensor component 1407 can also include an acceleration sensor, a gyroscope sensor, a magnetic sensor, a pressure sensor or a temperature sensor.

The communication component 1408 is to facilitate wired or wireless communication between the apparatus 1400 and other devices. The apparatus 1400 can access a wireless network based on a communication standard, such as Wi-Fi, 2G or 3G, or a combination thereof. In an example, the communication component 1408 receives a broadcast signal or broadcast related information from an external broadcast management system via a broadcast channel In an example, the communication component 1408 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth (BT) technology and other technologies.

In an example, the apparatus 1400 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, in order to perform the method described above.

In an example, an example of the present disclosure also provides a non-transitory readable storage medium that stores executable instructions, such as a memory 1402. The executable instructions can be executed by the processor 1409 of the apparatus 1400 to implement the above method. The readable storage medium can be a Read-Only Memory (ROM), a Random Access Memory (RAM), a CD-ROM, a magnetic tape, a floppy disk, an optical data storage device, and so on.

When the instructions in the storage medium are executed by the processor, the apparatus 1400 is caused to perform any one of the methods for access control barring.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method for access control barring, applied to a terminal, the method comprising:
    performing an access attempt at a designated coverage enhancement level;
    when the access attempt fails, determining a corresponding access attempt barring scheme based on a preset rule; and
    performing corresponding access attempt barring based on the corresponding access attempt barring scheme,
    wherein the preset rule comprises first indication information configured to indicate terminating an access attempt ahead of schedule; and
    the determining a corresponding access attempt barring scheme based on a preset rule comprises:
    determining a first barring scheme based on the first indication information, wherein the first barring scheme indicates terminating an access attempt at the designated coverage enhancement level ahead of schedule.

2. The method of claim 1, wherein the performing corresponding access attempt barring based on the corresponding access attempt barring scheme comprises:
    generating, through a media access control (MAC) layer of the terminal, error notification information configured to indicate that a random access process error has occurred, and sending the error notification information to a radio resource control (RRC) layer of the terminal.

3. The method of claim 2, wherein the error notification information comprises an indication of cause of the random access process error.

4. The method of claim 2, further comprising:
    terminating, through the RRC layer of the terminal, an RRC timer ahead of schedule based on the error notification information in response to receiving the error notification information, and notifying the MAC layer of the terminal to terminate further attempt.

5. The method of claim 2, further comprising:
withholding terminating, through the RRC layer of the terminal, the RRC timer ahead of schedule based on the error notification information in response to receiving the error notification information, and providing an additional condition for the MAC layer of the terminal to continue an access attempt at the designated coverage enhancement level.

6. The method of claim 1, wherein the preset rule is stipulated by a communication protocol or written into the terminal in a form of firmware.

7. The method of claim 1, wherein the preset rule is notified to the terminal by a base station through a system message or designated signaling; and
the determining a corresponding access attempt barring scheme based on a preset rule comprises:
when the designated signaling includes the preset rule, determining, through the terminal, an access attempt barring scheme corresponding to the designated coverage enhancement level based on the preset rule included in the designated signaling; and
when the designated signaling does not include the preset rule, determining, through the terminal, an access attempt barring scheme corresponding to the designated coverage enhancement level based on the preset rule included in the system message.

8. The method of claim 7, wherein the system message or the designated signaling also includes an effective time and/or an effective area for using the preset rule; and
the determining a corresponding access attempt barring scheme based on a preset rule comprises:
within the effective time and/or the effective area of the preset rule, determining an access attempt barring scheme corresponding to the designated coverage enhancement level based on the preset rule.

9. A terminal, comprising:
a processor; and
a memory for storing instructions executable by the processor;
wherein the processor is configured to:
perform an access attempt at a designated coverage enhancement level;
when the access attempt fails, determine a corresponding access attempt barring scheme based on a preset rule; and
perform corresponding access attempt barring based on the corresponding access attempt barring scheme,
wherein the preset rule comprises first indication information configured to indicate terminating an access attempt ahead of schedule; and
in determining the corresponding access attempt barring scheme based on the preset rule, the processor is further configured to:
determine a first barring scheme based on the first indication information, wherein the first barring scheme indicates terminating an access attempt at the designated coverage enhancement level ahead of schedule.

10. The terminal of claim 9, wherein in performing the corresponding access attempt barring based on the corresponding access attempt barring scheme, the processor is further configured to:
generate, through a media access control (MAC) layer of the terminal, error notification information configured to indicate that a random access process error has occurred, and send the error notification information to a radio resource control (RRC) layer of the terminal.

11. The terminal of claim 10, wherein the error notification information comprises an indication of cause of the random access process error.

12. The terminal of claim 10, wherein the processor is further configured to:
terminate, through the RRC layer of the terminal, an RRC timer ahead of schedule based on the error notification information in response to receiving the error notification information, and notify the MAC layer of the terminal to terminate further attempt.

13. The terminal of claim 10, wherein the processor is further configured to:
withhold terminating, through the RRC layer of the terminal, the RRC timer ahead of schedule based on the error notification information in response to receiving the error notification information, and provide an additional condition for the MAC layer of the terminal to continue an access attempt at the designated coverage enhancement level.

14. The terminal of claim 9, wherein the preset rule is stipulated by a communication protocol or written into the terminal in a form of firmware.

* * * * *